United States Patent [19]
Erwin, Jr.

[11] 3,733,494
[45] May 15, 1973

[54] REPLACEMENT COIL SET FOR AUTOMOBILE STARTER MOTORS

[76] Inventor: Henry P. Erwin, Jr., 1224 Arden Road, Pasadena, Calif. 91106

[22] Filed: May 15, 1972

[21] Appl. No.: 253,396

Related U.S. Application Data

[63] Continuation-in-part of Ser. No. 127,928, March 28, 1971.

[52] U.S. Cl. .................................... 290/38, 290/37
[51] Int. Cl. ............................................. F02n 11/00
[58] Field of Search ................... 290/33, 37; 123/179

[56] References Cited

UNITED STATES PATENTS

| | | | |
|---|---|---|---|
| 3,030,518 | 4/1962 | Jensen | 290/38 X |
| 3,923,830 | 2/1960 | Merriam et al. | 290/38 |

*Primary Examiner*—G. R. Simmons
*Attorney*—Robert L. Parker et al.

[57] ABSTRACT

An improved replacement field coil set is provided for automobile starter motors of the movable pole type having four field coils of which one coil serves as a pull-in and hold-in coil for the movable pole-piece in addition to serving as a field coil for inducing rotation of the motor armature. In the improved coil set, the one coil is comprised of a single winding formed by a single conductor of predetermined turns and dimensions so selected that the one coil operates to pull the movable pole-piece into the center of the coil during initial current flow only through the single winding and also during current flow through all coils to hold the movable pole-piece in its pulled-in position without chatter of the movable pole-piece during no-load operating conditions of the motor. The four coils of the improved coil set are interconnected in a two-and-two series-parallel relation to each other so that, upon installation of the coil set in a starter motor, the conductors interconnecting the coils of the set are all disposed at a common end of the motor.

4 Claims, 4 Drawing Figures

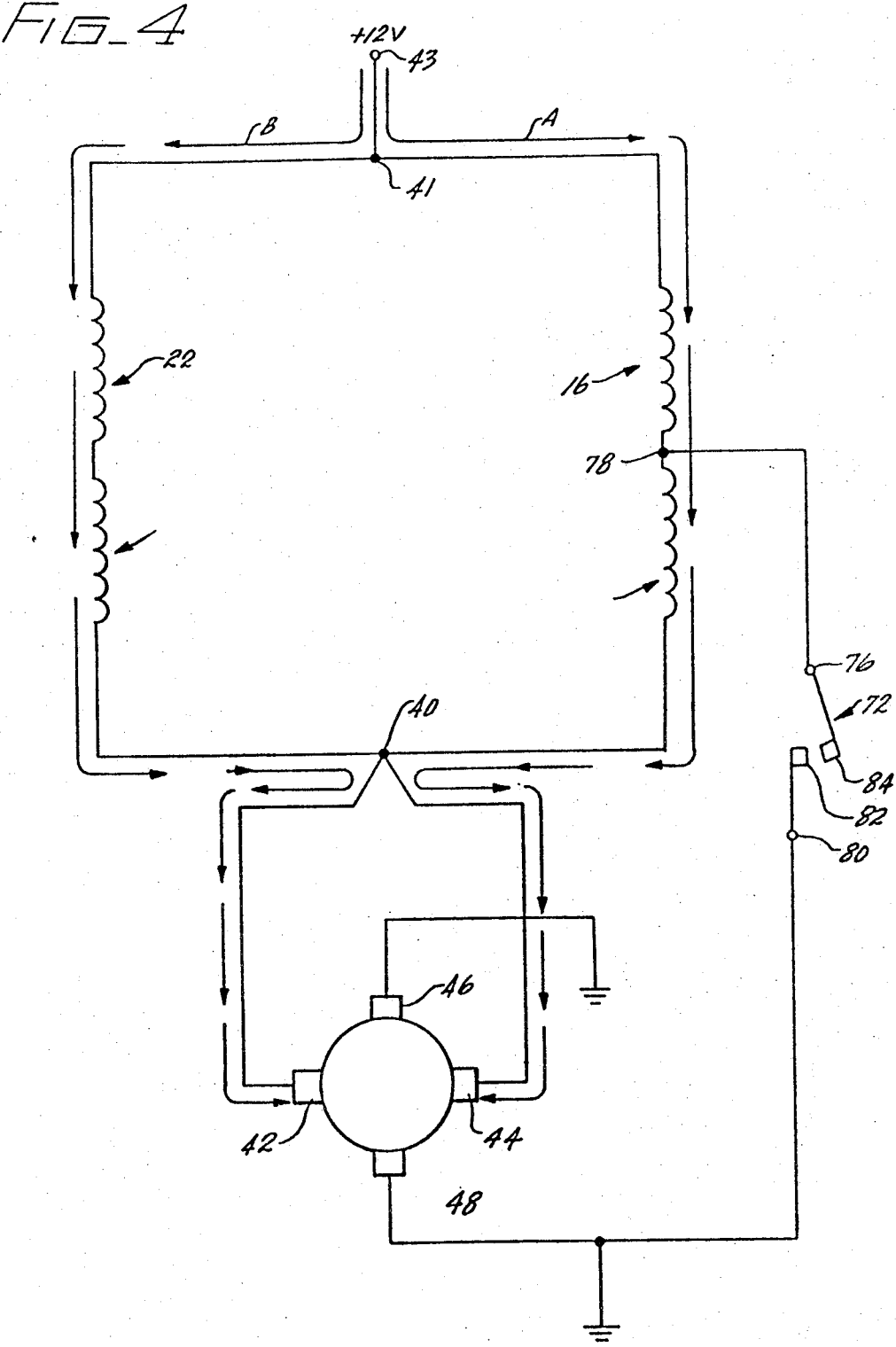

REPLACEMENT COIL SET FOR AUTOMOBILE STARTER MOTORS

CROSS-REFERENCE TO RELATED APPLICATION

This application is a continuation-in-part of my co-pending application, Ser. No. 127,928 filed Mar. 28, 1971 for Dual Purpose Coil For Automobile Starter Motors.

BACKGROUND OF THE INVENTION

1. Field of the Invention

This invention pertains to automobile starter motors and, more particularly, to replacement field coil sets for automobile starter motors of the movable pole-piece type.

2. Review of the Prior Art

Automobile starter motors are electric motors which are mounted to the automobile engine for selective coupling of the starter motor armature with the flywheel which conventionally is connected to the engine crankshaft. During use of the starter motor to crank the engine, the starter motor armature shaft is coupled to the flywheel via a pinion gear which is slidable along the starter motor armature shaft into and out of engagement with gear teeth defined on the rim of the flywheel. The pinion gear normally is biased by a suitable spring out of engagement with the flywheel. The pinion gear is moved into engagement with the flywheel by the operation of a solenoid which is energized during energization of the starter motor itself. The solenoid may be provided independently of the field coils provided in the starter motor, or the solenoid may have its winding defined by at least a part of one of the motor field coils. This invention is concerned with starter motors of the latter type, namely, starter motors of the movable pole-piece type wherein the movable pole-piece defines a part of the solenoid armature.

Movable pole-piece automotive starter motors are used as original equipment in many of the vehicles made by the Ford Motors Company. In such starter motors, a plurality of field coils, usually four in number, are disposed in he motor housing for cooperation with the motor armature. An opening is provided in the housing in alignment with the center of one of the field coils. The motor includes a magnetic pole-piece cooperating with each of four field coils. The pole-piece associated with the one coil is pivoted on the motor housing for movement from a normal position out of the opening during conditions when the starter motor is not being used. During use of the starter motor, current is directed initially only through the one coil to pull the movable pole-piece into the opening, and such movement advances the starter motor pinion gear along the starter motor shaft into engagement with the flywheel gear teeth. Such movement of the movable pole-piece opens a normally closed shunt switch connected to ground across the remaining field coils. After the shunt switch is opened, the one coil must function both as a field coil to induce armature rotation and also to hold the movable pole-piece in its pulled-in position.

It is particularly important that the field coil associated with the movable pole-piece function satisfactorily to maintain the pole-piece in its pulled-in position against the bias normally driving the pinion gear out of engagement with the flywheel. Because the coil associated with the movable pole-piece functions both to pull in and hold in the movable pole-piece, and also functions as a field coil with the remaining coils of the starter motor, this one coil is referred to as a "dual purpose coil."

Movable pole-piece starter motors are known colloquially as "Falcon" starter motors because they were originally developed for use with the Falcon line of automobiles. Falcon starter motors are provided in a 4½ inch size and in a smaller 4 inch version; the terms "4½ inch" and "4 inch" are used with reference to the diameter of the starter motor housing. As manufactured by the Ford Motor Company and its suppliers, the dual purpose coils of these starter motors consist of a pull-in winding which is defined by a small number of turns of a conductor of relatively large cross-sectional area, and by a hold-in winding defined by a large number of turns of a conductor of relatively small cross-section. Prior to movement of the movable pole-piece sufficiently to produce opening of the shunt switch, the current supplied to the starter motor flows only through the pull-in winding. After the movable pole-piece has pulled in to its operative position, the shunt switch is opened so that all field coils, including both the pull-in and hold-in windings of the dual purpose coil, are energized. The current which flows through all the field coils is less than the initial current flow through the pull-in winding and the remaining field coils. Thus, the magnetic field strength developed by the dual purpose coil of existing original-equipment movable pole-piece starter motors is reduced when current is directed to all of the coils.

Under no-load conditions, an original-equipment 4½ inch Falcon starter motor will draw a current of about 60 amps at full speed, assuming no chatter in the movable pole-piece assembly. As load increases, current demand increases until the load is sufficient to stall the motor, at which time the current flow through the coil is about 500 amps. The usual operational load of a starter motor of this type produces a current flow of from 200 to 300 amps. If an original-equipment Falcon starter motor, for example, is abused in use, as by extended operation in attempting to start a cold or otherwise hard-to-start engine, the fine wire hole-in coil of the original dual purpose coil tends to burn out. The hold-in winding and the pull-in winding of a dual winding, dual purpose coil for a movable pole-piece starter motor are intended to cooperate with each other to hold the movable pole-piece in its aperture as the motor is operated to crank the engine. The pull-in winding itself is not adequate, following opening of the shunt, to hold the movable pole-piece during no-load or light-load operation of the motor due to the added resistance provided by the other coils of the set. Thus, the presence of a burned out hold-in coil in an original-equipment starter motor of the movable pole-piece type means that the movable pole-piece will not hold in even under no-load conditions.

Because the movable pole-piece is spring biased to a normal position out of the aperture associated with the dual purpose coil, the movable pole-piece always tends to move out of intimate cooperative relation with the dual purpose coil. If such movement occurs during energization of the motor by reason of a defective hold-in winding, the shunt to ground around the hold-in winding and the other coils of the starter motor is opened, thereby reestablishing the initial current flow conditions through the pull-in winding. This event causes the moveable pole-piece to tend to bedrawn back into intimate cooperative relation with the dual purpose coil and the shunt to be reopened. Reopening of the shunt causes the movable pole-piece to again move away from the dual purpose coil, and so on. This cyclic movement of the movable pole piece is referred to as "chatter" of the starter motor. The presence of chatter in a starter motor, whether an original-equipment starter motor or a rebuilt starter motor, under no-load conditions is essentially universally regarded as indicative of a defective motor.

In the trade concerning rebuilt automotive starters there are several levels of operation. The upper level is constituted of manufactures of replacement parts for starters, and such manufacturers sell to businesses which rebuild starter motors. The rebuilders sell to wholesalers, who sell to distributors and automotive parts stores, who in turn sell to garages and mechanics who install the rebuilt starters in the vehicles of their customers. The rebuilt starters are subjected to operability tests at least by the rebuilder and by the mechanic, and also often by others in the chain. The conventional operability test for rebuilt starters of the movable pole-piece type is to connect the starter motor across a DC potential (an automotive battery) and to operate the motor under no-load conditions to ascertain that the motor armature rotates and that the movable pole-piece pulls in and holds in within its aperture associated with the dual purpose coil. If the rotor fails to turn, or if the movable pole-piece fails to hold in its aperture, the conclusion is that the rebuilt starter is defective and the starter is rejected. Thus, the presence of chatter in a rebuilt starter motor is evaluated under no-load full speed operating conditions of the motor. The principal cause of chatter in original-equipment movable pole-piece starter motors is the tendency of the fine wire hold-in winding of the original dual purpose coil to burn out in use.

Under no-load conditions, at full speed, the current flow through the field coils of the movable pole-piece starter motor is significantly lower than the current flow through the same coils during normal in-use load conditions. The result is that there is relatively little current available during the above-described rebuilt motor operability test to hold in the movable pole-piece and to prevent chatter. The problem of chatter, therefor, is a major problem which is faced by the manufacturers of replacement coil sets for automotive starter motors; this problem must be overcome by such manufacturers if they are to produce marketable products.

It is significant that the no-load operability test for chatter pertinent to starter motors of the movable pole-piece type was developed initially by automotive mechanics presented with customers complaining of starting problems in the customers' vehicles. If the test shown the presence of chatter, the correct conclusion was that the hole-in coil had burned out and that a new or rebuilt starter motor was required. The no-load operability test for chatter is a valid test only for original-equipment starter motors of the movable pole-piece type where the motors have been found, by use, to present problems.

Another significant fact is that, in use, starter motors (whether they are original-equipment motors or rebuilt motors) never operate under no-load conditions, but rather always operate under load conditions producing at least 200 amps current flow through the motor coils. Since many completely new original-equipment movable pole-piece starter motors manifest problems of chatter when operated under no-load conditions, it is apparent that the manufacturers of such motors recognize that starter motors normally never operate under no-load conditions; therefore, these manufactures do not concern themselves with chatter at no-load conditions. The persons in the trade of rebuilt starter motors, including automotive mechanics who must diagnose starting problems in customers' vehicles, on the other hand, attach paramount significance to the matter of chatter of the movable pole-piece under no-load conditions.

It is thus apparent that the no-load operability test is not necessarily a valid test for other original starter motors of other types or for rebuilt movable pole-piece starter motors which may chatter under no-load conditions but not under load conditions. The problem of chatter in a rebuilt starter motor, therefore, is a very real practical problem faced by the manufacturers of rebuilt starter motors and replacement coil sets but not by the manufacturer of the original-equipment movable pole-piece starter motors.

A basic objective of the rebuilt starter motor industry is to provide rebuilt motors which are superior to original motors and are far less prone to failure than original motors. This objective must be reached within design limitations of size and shape imposed by the structure of the original motors. That is, the replacement field coil set for a rebuilt starter moor must fit within the coil spaces provided in the original motor. Replacement coil sets cannot be sized and configured so as to require reworking of the casing or other elements of the original motor. The objective of superior in-use performance must be reached by the replacement coil manufacturer at the same time that the manufacturer is successfully overcoming the largely illusory problem of chatter. Superior performance is often achieved by the use of heavier gage wire and heavier and better insulation in the replacement coil set, and the problem of chatter usually is overcome by the provision of greater ampere turns in the pull-in and hold-in windings for the dual purpose coil. These approaches to the matter of superior performance are at odds with the space limitations imposed by the design of the original motor. It is apparent, therefore, that a need exists for a replacement field coil set for starter motors of the movable pole-piece type which is usable directly in the coil spaces provided in the original motor, which is not subject to problems of chatter under no-load or load conditions, and which is superior in performance and useful life to the field coils encountered in the original-equipment starter motors.

Also, to simplify the rebuilding process, it is desirable that the rebuilding operation involve minimum disassembly of the original-equipment motor. For this reason it is desirable that the replacement field coil set be capable of insertion directly into the coil spaces from one end of the starter motor, so that the rebuilding process may be carried out quickly and efficiently without extensive disassembly and reassembly of the starter motor. It is also desirable that the replacement coil sets be arranged to include minimal interconnecting conductors between the several coils of the set so that the replacement coil set may be fabricated quickly and efficiently and may be marketed to the lowest cost possible.

SUMMARY OF THE INVENTION

This invention provides an improved replacement coil set for an automotive starter motor of the movable pole-piece type. The present replacement coil set is not subject to problems of chatter at no-load operating conditions and, therefore, is readily marketable in the trade pertinent to rebuilt automotive starter motors. Further, the present coil set is so defined that it incorporates minimal interconnection between the several coils of the set, thereby making the coil set simple to insert into position in the motor casing with minimal disassembly of the motor casing. The dual purpose coil of the present coil set is superior to original-equipment dual winding dual purpose coils since the present dual purpose coil does not rely upon conductors of very small cross-sectional areas to provide the hold-in functions required of the dual purpose coil.

Generally speaking, this invention provides an improved replacement field coil set for an automobile starter motor of the movable pole type having four field coils in which one of the field coils serves as a pull-in and hold-in coil for a movable pole-piece in addition to serving as a field coil for inducing rotation of a motor armature. The improved coil set is distinguished in that the one coil of the set, i.e., the dual purpose coil, comprises a single winding of a single conductor of predetermined turns and dimensions sufficient that the one coil operates to pull the movable pole-piece into the center of the coil during initial current flow only through the one coil. Also, during current flow through all coils, the one coil functions to hold the movable pole-piece in its pulled-in position without chatter of the movable pole-piece during no-load operating conditions of the motor. The present improved coil set is also distinguished in that the four coils of the set are interconnected in a two-and-two parallel relation to each other, by virtue of which minimum conductors are required to interconnect the several coils of the set. The coil interconnecting conductors are disposed at a common end of the set.

DESCRIPTION OF THE DRAWINGS

The above-mentioned and other features of this invention are more fully set forth in the following detailed description of the presently preferred embodiment of the invention, which description is present with reference to the accompanying drawings, wherein:

FIG. 4 is a schematic diagram of the motor circuitry encountered when the coil set shown in FIG. 2 is used in the motor shown in FIG. 1.

DESCRIPTION OF THE PREFERRED EMBODIMENT

Figure 1:
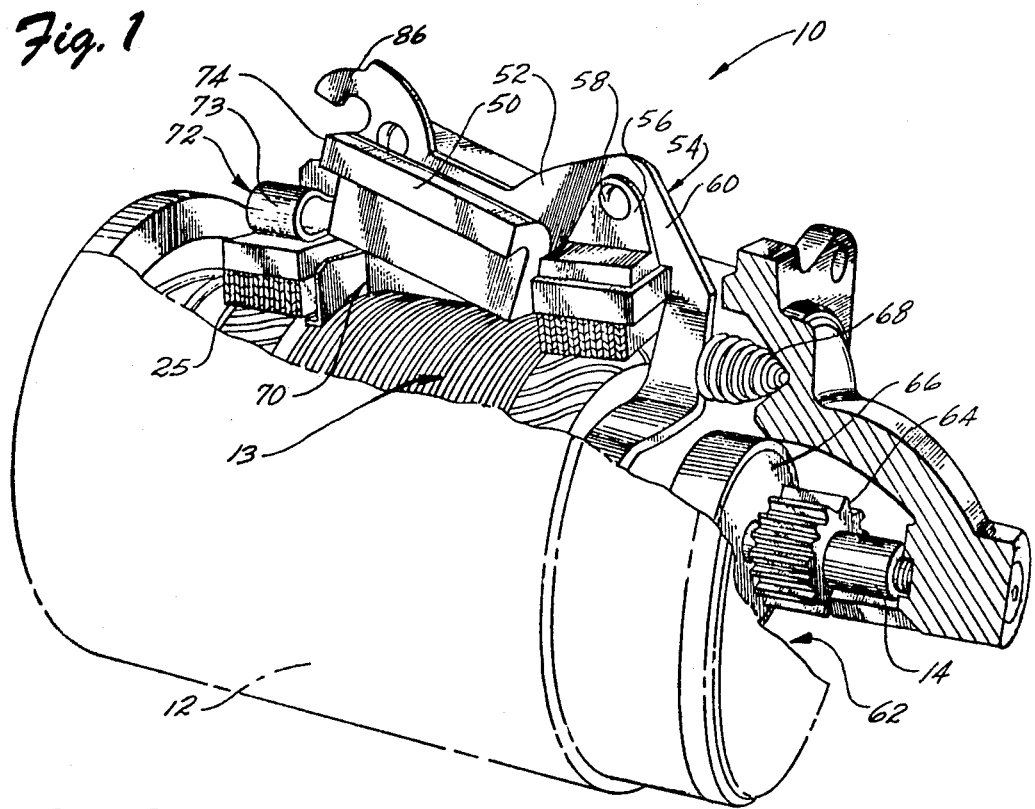
FIG. 1 is a perspective cutaway view of an automobile starter motor of the movable pole type.

An automobile starter motor 10 embodying the principles of this invention is described with reference to FIGS. 1, 2 and 4. As a whole, the motor is a four-pole DC motor commonly used on Ford Falcon automobiles, for example; specifically, starter motor 10 is the type of starter motor commonly referred to as a "4 inch Falcon starter." The motor includes a cylindrical housing 12 in which is contained a conventional commutator/armature assembly 13, referred to hereafter as "the armature." The armature is defined about a shaft 14 which is made to rotate in response to the flow of current through four field coils 16, 18, 20 and 22 mounted within the housing in quadrature disposition about the armature.

Figure 2:
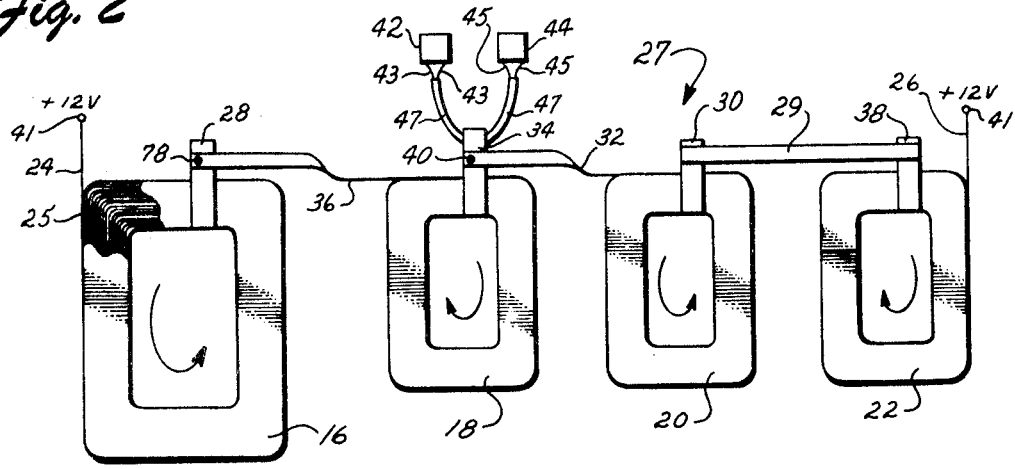
FIG. 2 is a simplified semischematic illustration of the replacement coil set provided by this invention for use in the motor shown in FIG. 1.

As shown best in FIGS. 2 and 4, the field coils are connected together in what may be termed a two-and-two series-parallel connection in that adjacent coils 16 and 18 are connected in series with each other and adjacent coils 20 and 22 are connected in series with each other. Coils 16 and 18 are connected in parallel with coils 20 and 22 between junction points 40 and 41. An outer end 24 of coil 16 and an outer end 26 of coil 22 are each connected through a junction 41 to the positive terminal 43 of a 12 volt automobile battery (not shown). An inner end 28 of coil 16 is connected via an interconnecting conductor 36 to an outer end of coil 18 which has an inner end connected to junction point 40. As shown in FIG. 2, it is preferred that interconnecting conductor 36 between coils 16 and 18 be defined by the conductor used to define field coil 18. An inner end 38 of field coil 22 is connected via an interconnecting conductor 29 to an inner end 30 of field coil 20. Field coil 20 has its outer end connected via an interconnecting conductor 32 to junction point 40, and it is preferred that interconnecting conductor 32 be defined by the same conductor used to define the winding of field coil 20.

It will be apparent from the foregoing description of the arrangement of coils 16, 18, 20 and 22 in a two-and-two series-parallel relationship, in conjunction with an examination of FIGS. 2 and 4, that when current flows through all of the field coils, the current flow through coils 18 and 22 is in an opposite direction (in terms of clockwise or counterclockwise flow) to the flow of current through coils 16 and 20. Also, it is apparent that each coil of the several field coils is connected directly to the coil on either side of it in coil set 27 depicted in FIG. 2.

Each of field coils 18, 20 and 22 has an associated field pole (not shown) which is fixedly mounted within motor housing 12 and is positioned within the center opening of the respective coil. Coil 16, when operating as a field coil, also has a field pole 50 positioned in its center. Field pole 50, however, is movably mounted to motor housing 12 for movement into and out of an operating position within the center of coil 16.

As shown in FIGS. 2 and 4, a pair of brushes 42 and 44 are connected to junction point 40 by respective pairs of conductors 43 and 45, each disposed in a sleeve of suitable insulation material 47. The brushes are disposed at opposite sides of the armature when coil set 27 is properly installed in motor 10. These brushes are hereafter referred to as the "hot brushes" since they are connected directly to the battery through the field coils. An additional pair of brushes 46 and 48 are each positioned on opposite sides of armature 13 in quadrature relation to brushes 42 and 44.

When current is directed to flow through all four coils in the manner described below, it follows two separate serial paths which are themselves defined in parallel. A first current path A is defined from junction 41 through coils 16 and 18 in series with hot brush 44 through junction 40. A second current path B is defined from junction 41 through coils 22 and 20 in series with hot brush 42 through junction 40.

Upon energization of all four field coils in coil set 27, the current flow through the coils along paths A and B sets up a magnetic field about the armature to produce a counterclockwise torque contributing in part to a corresponding rotation of the armature. Additional torque to cause armature rotation is produced by the flow of current into and out of a number of conductors (not shown) embedded in longitudinal slots in the surface of the armature as is known from the general principles of operation of DC motors. Current is let into and out of these conductors when the hot brushes make contact with the commutator portion of the armature. The commutator defines a predetermined current flow path through the conductors such that the magnetic field developed as current flows through each conductor produces a counterclockwise torque on the armature to assist the torque developed by the field coils.

Coil 16 is used not only as a field coil for inducing rotation of armature 13, but also as a solenoid. It is for this reason, as noted above, that coil 16 is referred to as a dual purpose coil.

Field pole 50, provided for cooperation with dual purpose coil 16, is carried on the underside of the rear end of lever arm 52 which comprises a part of a control assembly 54. The lever arm is of unitary construction and is hinged by a hinge pin 58 intermediate its ends to a hinge bracket 56 affixed to the outer surface of motor housing 12. The forward end of lever arm 52 defines a fork 60 which cooperates with opposite sides of a drive gear assembly 62 slidably mounted on armature shaft 14 for rotation with the armature but yet selectively movable axially along the armature shaft.

Drive gear assembly 62 includes a gear 64 for engaging corresponding gear teeth (not shown) defined on a flywheel (not shown) of an automobile engine with which starter motor 10 is used. Drive gear assembly 62 further includes an overrunning clutch for preventing the starter motor armature from being driven by the flywheel after the engine to which the flywheel is connected has been started by operation of the starter motor. A spring 68 is biased between the motor housing the the forked end of lever arm 52 to bias the lever arm to a normal position, shown in FIG. 1, in which movable pole-piece 50 is disposed out of a receiving aperture 70 formed in the motor housing; aperture 70 is defined to coincide with the center opening of dual purpose coil 16. This normal position of lever arm 52 corresponds to a retracted position of drive gear assembly 62 along armature shaft 14 in which gear 64 is disengaged from the flywheel gear teeth. Conversely, when lever arm 52 is moved sufficiently about hinge pin 58 to provide engagement of pinion gear 64 with the flywheel gear teeth, the movable pole-piece carried by the lever arm is disposed within receiving aperture 70 to be located within the center opening of dual purpose coil 16.

A normally closed switch 72 is defined in part by a leaf spring 73 which is mounted on the outer surface of the motor housing adjacent the rear end of receiving aperture 70. As shown best in FIG. 4, switch 72 has one terminal 76 thereof electrically connected to a junction point 78 representing the point of connection between dual purpose coil 16 and field coil 18. Switch 72 also has another terminal 80 connected to ground. Switch contacts 82 and 84 are normally biased into contact with each other by spring 73, and in this state a circuit path is defined from junction 78 to ground, thereby enabling current to flow from the battery only through dual purpose coil 16 and thence to ground. So long as switch contacts 82 and 84 are enclosed, current does not flow through field coils 18, 20 and 22 because of the added impedance represented by the remaining field coils and by armature 13.

Switch 72 is operated into its open state when current initially flows through dual purpose coil 16. Such current flow occurs when the ignition key is turned in the vehicle to connect the battery to motor energization terminal 43, i.e., to the outer ends of field coils 16 and 22. This initial flow of current through coil 16 sets up a magnetic field about the coil which is of sufficient strength to attract movable pole-piece 50 toward the coil and to move lever arm 52 against the bias of spring 68 sufficiently that pole-piece 50 moves into its pulled-in position within aperture 70. The rear end of lever arm 52 carries a lug 86 which is so positioned that, upon movement of the movable pole-piece into aperture 70, the lug engages and depresses spring 72 to open switch contacts 82 and 84. Opening of switch contacts 82 and 84 removes the shunt across field coils 18, 20 and 22 and across armature 13. Removal of this shunt allows current to flow from the battery via the motor energization terminal 43 through all of the field coils and the armature to ground. As noted above, this operation of switch 72 corresponds to movement of drive gear assembly 62 along armature shaft 14 into engagement with the flywheel gear teeth so that continued operation of the starter motor produces cranking of the automobile engine.

Figure 3:
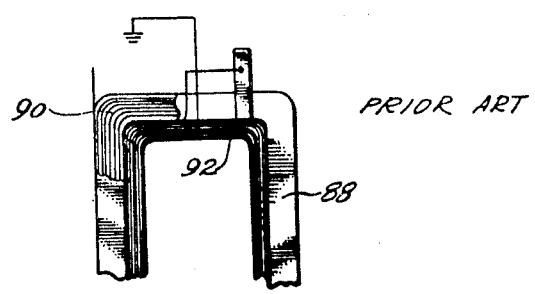
FIG. 3 is a typical prior art dual winding, dual purpose coil.

A typical prior art coil 88, shown in FIG. 3, was developed to satisfy the pull-in and hold-in requirements of the dual purpose coil for starter motors of the movable pole-piece type. Coil 88 was and still is used on motors like motor 10, primarily by the Ford Motor Company in original-equipment starter motors, and also by some rebuilders of starter motors. Dual purpose coil 88 is comprised of two windings, namely, a pull-in winding 90 of a few turns of conductor of relatively large cross-sectional area and a hold-in winding 92 of many turns of a conductor having relatively small cross-sectional area. During current flow through all of the field coils, the magnetic field developed by winding 92 is of sufficient strength to supplement that developed by winding 90 so that the field pole is continuously maintained in the center of the dual purpose coil. Where a dual purpose coil having the configuration of coil 88 is used, junction point 78 (see FIG. 4) for the shunt across all the other field coils is defined at a point in the motor circuit between pull-in winding 90 and hold-in winding 92. Thus, during periods when the shunt is established, hold-in winding 92 is effectively removed from the motor circuit with the other field coils by the shunt path; hold-in winding 92 is energized in these prior motors only after the movable pole-piece has moved into the center of pull-in winding 92 to open the shunt switch.

A typical prior art dual purpose coil has a seven-turn pull-in winding 90 defined by a conductor having a cross-sectional area of approximately 0.01 square inch. Such a coil also includes a 100-turn hold-in winding defined by a conductor having a cross-sectional area of approximately 0.0002 square inch. It was this fine-wire, many-turn hold-in winding which manifests a disturbing tendency to burn out during use of the motor.

The single winding 25 of the present dual purpose coil 16 has eleven turns defined by a single length of strip-like conductor having a width of 0.265 inch and a thickness of 0.040 inch (0.0106 square inch cross-sectional area), plus or minus 0.005 inch on each of the aforesaid dimensions. When such a conductor is combined with suitable insulation, preferably cloth insulation, dual purpose coil 16 is of the proper dimension to fit directly into the space provided for the dual winding, dual purpose coil of an original-equipment 4 inch Falcon starter motor. Although the current which initially flows through coil 16 when shunt switch 72 is closed is on the order of 220 amps, as opposed to 300 amps (due to the smaller area and longer length of the single winding), the increased turns of coil 16, as contrasted with the turns of pull-in coil 90, more than compensate for the lower current flowing through coil 16, thereby providing more than adequate pull-in power for acting upon movable pole-piece 50. Further, when only 60 amps no-load current flows through coil 16 upon the removal of the shunt controlled by switch 72, the increased turns of winding 25 relative to the pull-in winding 92 of coil 88 provides sufficient magnetic field strength to hold in movable pole-piece 50.

It is preferred that field coils 18, 20 and 22 of coil set 27 be defined from corresponding lengths of the same conductor used to define winding 25 of dual purpose coil 16. Coils 18, 20 and 22, as shown in FIG. 2, are of smaller overall dimension than dual purpose coil 16 since these coils serve only as field coils to effect rotation of the motor armature. Preferably, coils 18 and 20 are defined by 7¼ turns of the aforesaid conductor, and coil 22 is defined by seven turns of this conductor.

As shown best in FIG. 2, each of the field coils of coil set 27 are of rectangular configuration and include two parallel long sides and two parallel short sides. Each side, whether long or short, of each of the coils is considered to constitute one-fourth of a turn.

FIG. 2 also illustrates that each of field coils 16, 18, 20 and 22 has its inner and outer ends arranged along a common end of coil set 27. For the sake of convenience, the end of the coil set to which brushes 42 and 44 are connected is referred to as the upper end of the coil set. Also, it is seen from FIG. 2 that interconnecting conductors 29, 32 and 36 are also all disposed along the upper end of the coil set. There are no coil ends or interconnecting conductors provided along the lower end of the coil set. Thus, coil set 27 may be inserted easily into the coil spaces provided in an original-equipment starter motor which is to be rebuilt and in which the rebuilding process includes the insertion of coil set 27 into the motor housing in place of the coils originally provided. This phase of the motor rebuilding operation may be accomplished simply by removing merely one end closure of motor housing 12 and inserting the replacement coil set into the coil spaces. This procedure involves minimum disassembly and reassembly of the structure of motor 10.

Because dual purpose coil 16 is defined by only a single winding of conductor of large cross-section, this winding is not subject to being burned out during continued use of the starter motor, as during cranking of a hard-to-start engine. Further, dual purpose coil 16 is not susceptible to chatter under no-load operating conditions, and thus successfully overcomes a major problem faced by the manufacturers for the replacement coil sets useful in the industry addressed to rebuilt starter motors.

Although the invention has been described above with respect to a specific starter motor having a dual purpose coil of specific dimensions and turns, workers skilled in the art to which this invention pertains will recognize that modifications and alterations of the above-described coil set may be made without departing from the spirit of this invention. Accordingly, the foregoing description is not to be considered as limiting the scope of this invention.

What is claimed is:

1. An improved replacement field coil set for an automobile starter motor of the movable pole type having four field coils, one of which serves as a pull-in and hold-in coil for a movable pole-piece in addition to serving as a field coil for inducing rotation of a motor armature, the improved field coil set being distinguished in that the one coil comprises a single winding of a single conductor of predetermined turns and dimensions sufficient that the one coil operates to pull the movable pole-piece into the center thereof during initial current flow only through the one coil and, during current flow through all coils, to hold the movable pole-piece in its pulled-in position without chatter of the movable pole-piece during no-load operating conditions of the motor, and further distinguished in that the four coils are interconnected in a two-and-two series-parallel relation to each other.

2. A coil set according to claim 1 wherein the set includes three field coils in addition to the one coil, and each pair of coils connected in series relation to each other are adjacent each other in the coil set.

3. A coil set according to claim 2 wherein each of the four coils of the set has its inner and outer end disposed at a common end of the set, and including interconnecting conductors connected between the several coils at said common end of the set.

4. A coil set according to claim 1 wherein the single conductive winding of the one coil is defined by about eleven turns of a conductor having a cross-sectional area of about 0.0106 square inch.

* * * * *